United States Patent [19]
Feldman et al.

[11] Patent Number: 5,202,775
[45] Date of Patent: Apr. 13, 1993

[54] RADICALLY SYMMETRIC HOLOGRAM AND METHOD OF FABRICATING THE SAME

[75] Inventors: Michael R. Feldman; W. Hudson Welch; James E. Morris, all of Charlotte, N.C.

[73] Assignee: University of North Carolina, Charlotte, N.C.

[21] Appl. No.: 787,075

[22] Filed: Nov. 4, 1991

[51] Int. Cl.$^5$ .............................................. G03H 1/08
[52] U.S. Cl. ............................................ 359/11; 359/9
[58] Field of Search ........................... 359/9, 11, 15, 19

[56] References Cited

U.S. PATENT DOCUMENTS

| | | | |
|---|---|---|---|
| 4,688,880 | 8/1987 | Tatsuno et al. | 359/19 |
| 4,830,442 | 5/1989 | Moss | 359/19 |
| 4,880,286 | 11/1989 | Ih | 359/9 |
| 5,016,953 | 5/1991 | Moss et al. | 359/9 |
| 5,075,800 | 12/1991 | Hasman et al. | 359/900 |

*Primary Examiner*—Bruce Y. Arnold
*Assistant Examiner*—J. P. Ryan
*Attorney, Agent, or Firm*—Bell, Seltzer, Park & Gibson

[57] ABSTRACT

A radially symmetric iterative discrete on-axis hologram has a high diffraction efficiency for a correspondingly small f-number. The radially symmetric hologram has a plurality of concentric constant radial phase fringes. Each fringe has a predetermined plurality of radial phase rings and each fringe corresponds to a predetermined plurality of radial phase transition points and a radial phase value between the radial phase transition points. The radially symmetric iterative discrete on-axis hologram also has radial phase fringes with a predetermined number of phase levels, at least two adjacent fringes have a phase level difference which is greater than one and less than the predetermined number minus one. The radially symmetric iterative discrete on-axis hologram is fabricated by determining a plurality of concentric fringes of constant phase with a plurality of radial phase transition points and radial phase values between the radial phase transition points for each concentric fringe. The plurality of radial phase transition points and radial phase values are repeatedly optimized to obtain optimized radial phase transition points and optimized radial phase values which maximize the diffraction efficiency. A radially symmetric hologram with concentric fringes of constant radial phase corresponding to the optimized radial phase transition points and the optimized radial phase values is then fabricated using known fabrication techniques.

21 Claims, 13 Drawing Sheets

FIG. 11A.

| F/# | DIFFRACTION EFFICIENCY ||
|---|---|---|
| | DS | RSIDO |
| 1.0 | 40% | 84% |
| 1.5 | 41% | 93% |
| 2.0 | 83% | 96% |
| 5.0 | 97% | 100% |

FIG. 11B.

| F/# | DIFFRACTION EFFICIENCY ||
|---|---|---|
| | DS | RSIDO |
| 1.0 | * | 70% |
| 1.5 | 40% | 84% |
| 2.0 | 40% | 92% |
| 5.0 | 97% | 99% |

FIG. 11C.

| F/# | DIFFRACTION EFFICIENCY ||
|---|---|---|
| | DS | RSIDO |
| 1.0 | * | 30% |
| 1.5 | * | 53% |
| 2.0 | 41% | 68% |
| 5.0 | 41% | 95% |

RADICALLY SYMMETRIC HOLOGRAM AND METHOD OF FABRICATING THE SAME

FIELD OF THE INVENTION

This invention relates to holography, and more particularly to hologram fabrication methods and the holograms fabricated thereby.

BACKGROUND OF THE INVENTION

Improvements in holographic technology have caused holography to play a major role in modern optical systems. Today, holograms are widely used as diffractive optical elements in a wide variety of applications including high resolution imaging systems, focusing and collimating optics, aspheric element testing, and chromatic aberration correction of refractive elements.

It is currently known to fabricate holograms for diffractive optics by creating interference among coherent light beams on a photographic plate and then developing the photographic plate. See U.S. Pat. No. 4,607,914 to Fienup entitled *Optical System Design Techniques Using Holographic Optical Element*, U.S. Pat. No. 4,649,351 to Veldkamp et al. entitled *Apparatus and Method for Coherently Adding Laser Beams*, and U.S. Pat. No. 4,813,762 to Leger et al. entitled *Coherent Beam Combining of Lasers Using Microlenses and Diffractive Coupling*.

Unfortunately, holograms produced by interference among coherent light beams contain internal features which produce the hologram's interference fringes. These interferometric holograms must typically be produced individually, using precision equipment to produce interference among coherent light beams on a photographic plate. These holograms, therefore, are difficult to mass produce.

In order to overcome the mass production problems with interferometric holograms, Computer Generated Holograms ("CGH") have been developed. CGHs have been fabricated by calculating the desired holographic pattern to perform a particular function and then forming the pattern on a glass or other substrate using photolithographic or other techniques. This technique is described, for example, in U.S. Pat. No. 4,960,311 to Moss et al. entitled *Holographic Exposure System For Computer Generated Holograms*.

It is also known to design these CGHs using iterative discrete encoding. In iterative discrete encoding, the hologram is divided into a two-dimensional array of rectangular cells. An initial transmittance value for each rectangular cell is chosen and the optimized phase for the hologram is calculated. An iterative optimization process is then used to optimize the transmittance values of the cells. An error function for the hologram is then calculated based upon the image quality. A single cell is changed and the change in the output pattern is computed. The error function is then recalculated. Based upon the change in the error function, the change is either accepted or rejected. The process is iteratively repeated until an acceptable value of the error function is reached which optimizes the image quality. The use of computers is ideal for performing these iterations because of the immense time involved in the optical system calculations.

For examples of the use of the iterative encoding method for CGHs see Japanese Patent 59-50480 to Denki K.K. et al. entitled *Checking Device of Reproduced Image of Calculating Hologram* and U.S. Pat. No. 4,969,700 to Haines entitled *Computer Aided Holography and Holographic Computer Graphics*. Iterative encoding is also described in publications entitled *Computer-Generated Holograms for Geometric Transformations*, Applied Optics, Vol. 23, No. 18, pp. 3099-3104, 1984, by Cederquist and Tai, and *Computer-Generated Rainbow Holograms*, Applied Optics, Vol. 23, No. 14, pp. 2441-47, 1984, by Leseberg and Bryngdahl. Also, an Iterative Discrete On-Axis ("IDO") encoding method is discussed in the publication entitled *Iterative Encoding of High-Efficiency Holograms for Generation of Spot Arrays*, Optical Society of America, pp. 479-81, 1989, by co-inventor Feldman et. al. the disclosure of which is hereby incorporated by reference.

A major obstacle to implementing such iterative discrete encoding methods for small f-number optical elements has been the low diffraction efficiency ($\eta$) achieved by this method, typically less than 50%. Commercial CGH software packages are currently available, such as CODE V from Optical Research Associates of Pasedena, Calif., that model holograms as a continuous phase profile for high efficiency optical systems. Although theoretically iterative encoding methods may achieve 100% diffraction efficiency, a continuous phase profile is necessary in order to achieve such results. Holograms, however, are typically fabricated using Very Large Scale Integration ("VLSI") fabrication technology which is discrete in nature. Unfortunately, VLSI fabrication technology does not allow fabrication of a continuous phase profile. Therefore, when the holograms are fabricated based on the continuous phase profile, the diffraction efficiency is substantially reduced.

In an effort to overcome this fabrication obstacle, radially symmetric holograms have been developed which use discrete phase levels (N) as an approximation to the continuous phase profile. First, the CGHs are modelled as continuous phase-only holograms in an optical design ray tracing program such as CODE V mentioned above. Subsequently, the continuous phase function is sampled and approximated to the nearest discrete phase level (N). This method has become known as the "Direct Sampling" method.

The maximum number of phase levels ($N_{max}$) employed in such a CGH is given by, $$N_{max} \leq \frac{T_{min}}{\delta} \qquad (1)$$

where $\delta$ is the smallest feature size capable of fabrication and $T_{min}$ is the minimum diffractive grating period. For a collimating or focusing lens, $T_{min}$ is related to the hologram f-number by, $$T_{min} = \lambda \sqrt{1 + (2 \times f\text{-number})^2} \qquad (2)$$

where the f-number may be defined as the focal length of an optical element over the diameter of that optical element, and $\lambda$ is the wavelength of the light source.

The diffraction efficiency ($\eta$) of a CGH using discrete phase levels may be given by $$\eta = \left[\frac{N \sin\left(\frac{\pi}{N}\right)}{\pi}\right]^2 \quad (3)$$

The Direct Sampling method for fabricating radially symmetric holograms uses a series of J photolithographic masking and etching steps. Holograms fabricated by this method have a series of circular rings and the difference in the number of phase levels (N) between any two adjacent rings is equal to one (1), except between fringes where the difference is equal to N−1. The relationship between the number of masks (J) and the number of phase levels (N) is given by $$N = 2^J \quad (4)$$

The Direct Sampling method is described in U.S. Pat. No. 4,895,790 by Swanson et al. entitled *High-Efficiency, Multilevel, Diffractive Optical Elements*.

Unfortunately, these known radially symmetric holograms have a low diffraction efficiency when a small f-number is required due to the small feature size limitations which are inherent in the fabrication procedure. Note that as the CGH f-number decreases, the CGH grating period decreases so that according to equation (1) only a small number of phase levels may be employed. This results in a low diffraction efficiency from equation (3). In addition, equation (3) is only valid if the CGH minimum feature size ($\delta$) is much smaller than $T_{min}/N$.

In practice, for N>2, the actual CGH diffraction efficiency is significantly less than that given by equation (3) when the CGH minimum feature size ($\delta$) is comparable to $T_{min}/N$. Although diffraction efficiencies exceeding 90% have been reported for large f-number elements (f-number > 30), diffraction efficiencies for small f-number CGHs with the above procedure are typically about 40-50% due to the fabrication feature size limitations. Therefore, there is a continued need for a hologram with a high diffraction efficiency when a small f-number is required.

SUMMARY OF THE INVENTION

It is therefore an object of the present invention to provide an improved radially symmetric hologram and a method of fabricating the same.

It is another object of the invention to provide an improved computer generated hologram.

It is also an object of the present invention to provide a method of fabricating small f-number holograms with significantly higher diffraction efficiencies than in known previous encoding methods.

These and other objects are provided, according to the present invention, by a radially symmetric iterative discrete on-axis ("RSIDO") encoding method for holograms, and the holograms produced thereby. The radially symmetric iterative discrete on-axis hologram of the present invention is fabricated by determining a plurality of concentric fringes of constant radial phase. A plurality of radial phase transition points and radial phase values between these radial transition points for each concentric fringe is then determined. These radial transition points and radial phase values are repeatedly optimized in order to obtain optimized radial phase transition points and optimized radial phase values that maximize the performance characteristics of the hologram. The radially symmetric hologram is then fabricated onto a substrate based upon these optimized radial phase transition points and radial phase values.

In particular, a RSIDO hologram is divided into a series of rings. The hologram is completely characterized by radial phase transition points and radial phase values for each ring. The radial phase transition points are initially selected by a sub-optimum method and the radial phase values are evenly distributed among the hologram rings. An initial hologram transmittance is chosen and the diffraction pattern is computed. An error function that is a measure of image quality is then calculated. The error function is chosen in such a way that it is minimized when a diffraction pattern with high performance is produced.

The transmittance of one ring of the hologram is changed and a new diffraction pattern and a new error function are calculated. If the trial transmittance decreases the error function, the change is accepted. If the error function increases, the hologram transmittance change is conditionally accepted with a probability that decreases with successive iterations. A single iteration is considered complete after all hologram rings have been updated one time. This iterative process is continued until the hologram transmittance function is found that produces an acceptable diffraction pattern. This iterative optimization routine, in turn, is used to determine the optimal set of radial transition points and radial phase values that maximize the hologram diffraction efficiency while minimizing aberrations.

The RSIDO encoding method of the present invention may be used to generate holograms with simulated diffraction efficiencies much higher than with any other methods known to the inventors. Diffraction efficiencies may be obtained that are much higher than conventionally encoded holograms because in order to get the same high efficiencies a large f-number is required with the previously known methods due to feature size limitations which are inherent in the fabrication procedure.

RSIDO encoding differs from known IDO encoding methods because known IDO encoding methods divide the hologram into an array of rectangular cells and the transmittance of each cell is determined by iterative optimization routines. In RSIDO, on the other hand, the hologram is divided into an array of rings. The transmittance of the ring as well as the boundaries of each ring are determined by iterative optimization routines. Moreover, if previous IDO encoding methods were used to encode a transmittance function with radial symmetry, the resulting hologram would be much different than an RSIDO encoded hologram. This is because previous IDO encoding methods limited the possible phase transition points to the locations of the rectangular cell boundaries.

The RSIDO encoding method also differs from the Direct Sampling method of conventional radially symmetric holograms. In particular, the RSIDO encoding method iteratively determines the discrete hologram transmittance by the location of fringes of constant phase rather than the locations of rings of arbitrary phase. Each fringe, in turn, contains several rings with the same phase transmittance. Because the RSIDO encoding method determines the location of fringes of constant phase rather than the locations of rings of arbitrary phase, the computation time for performing the iterative optimization is substantially reduced.

Also, holograms fabricated by the RSIDO encoding method differ from holograms fabricated by the Direct Sampling method of conventional radially symmetric holograms. The conventional radially symmetric holograms have a series of concentric rings, and the difference in the number of phase levels (N) between any two adjacent rings is equal to one (1), except between fringes where the difference is equal to the number of phase levels minus one (N−1). In contrast, RSIDO encoded holograms differ from conventional radially symmetric holograms because in RSIDO encoded holograms, having N phase levels, the difference in the number of phase levels (N) between any two adjacent fringes is greater than one (1) and less than the predetermined number of phase levels minus one (N−1); i.e., "phase skipping" is present.

BRIEF DESCRIPTION OF DRAWINGS

FIGS. 11A-11C are a set of tables which compare the results for radially symmetric holograms fabricated by the Direct Sampling method versus radially symmetric holograms fabricated by the RSIDO method of the present invention.

DESCRIPTION OF A PREFERRED EMBODIMENT

The present invention now will be described more fully hereinafter with reference to the accompanying drawings in which a preferred embodiment of invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Figure 1:
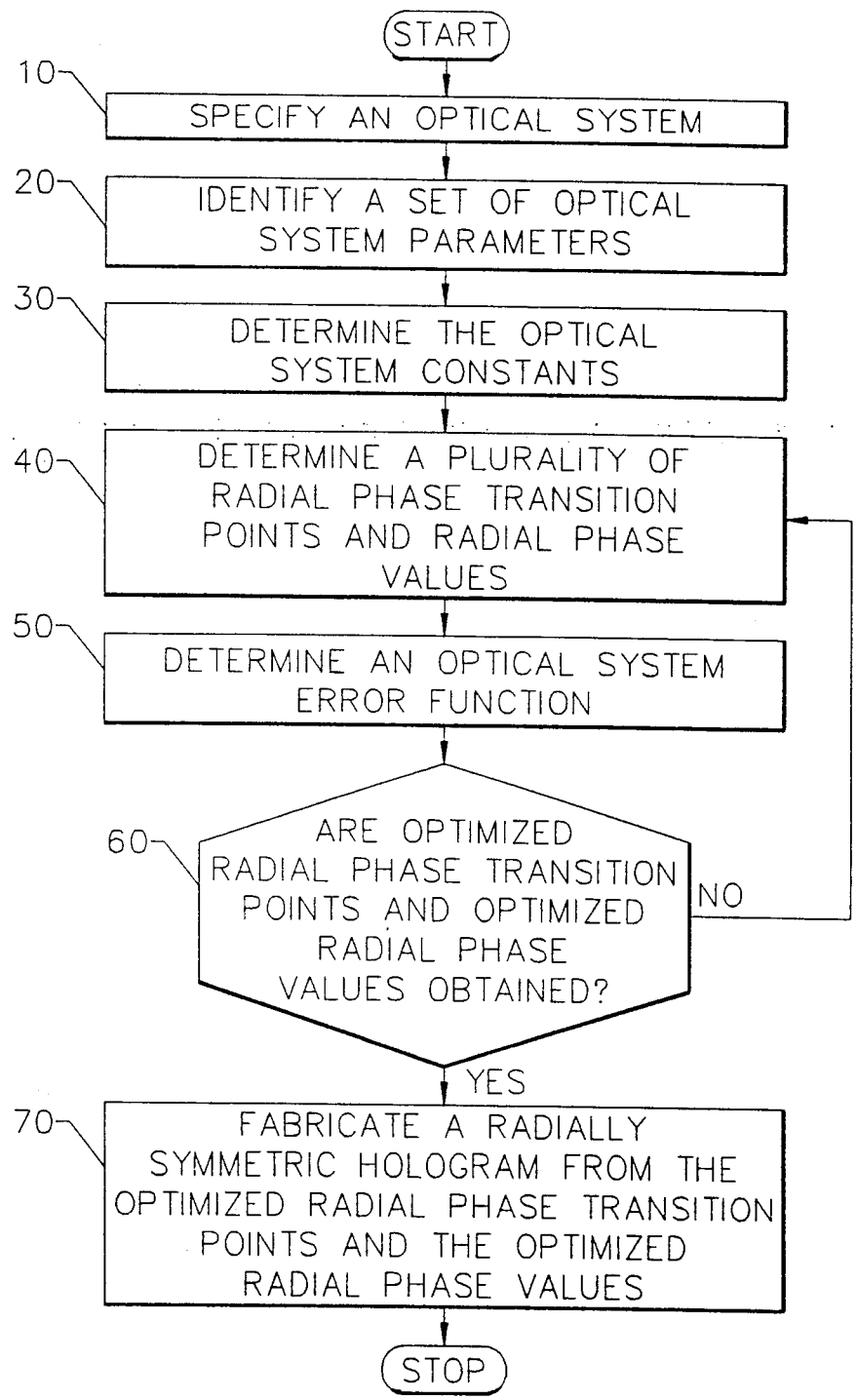
FIG. 1 schematically illustrates a process for fabricating a radially symmetric hologram according to the present invention.

Referring now to FIG. 1, a method for fabricating a radially symmetric hologram according to the invention will now be described. As shown in block 10 the desired optical system is first specified. In this step, the designer determines the performance characteristics for the optical system. For example, the designer may want to use the hologram for collimating light in optical interconnects. If this is the desired application, then the designer specifies the desired optical system performance to achieve the desired results.

Then, referring to block 20, the optical system parameters are identified. Once the desired optical system has been specified, the designer may identify a set of optical parameters for the given system by performing geometric, radiometric, or scalar diffractive calculations well known to those skilled in the art. These optical system parameters may include the curvature of the element, the refractive index of the element, location and size of optical elements, an image point, focal length, the size of an image, relative spacing between elements if more than one is included in the system, and the wavelength of the light source.

After the initial optical system parameters are identified, the optical system constants are then determined as shown in block 30 of FIG. 1. The optical system constants, well known to those skilled in the art, may be determined by utilizing the identified set of optical system parameters. For example, the f-number of an optical system is normally determined by the focal length of the element divided by the diameter of that element. Both the element focal length and element diameter are initial optical system parameters identified in the step shown in block 30. Once the f-number is calculated, it will remain the same throughout various changes to improve the imaging performance of the specified optical system.

Figure 2:
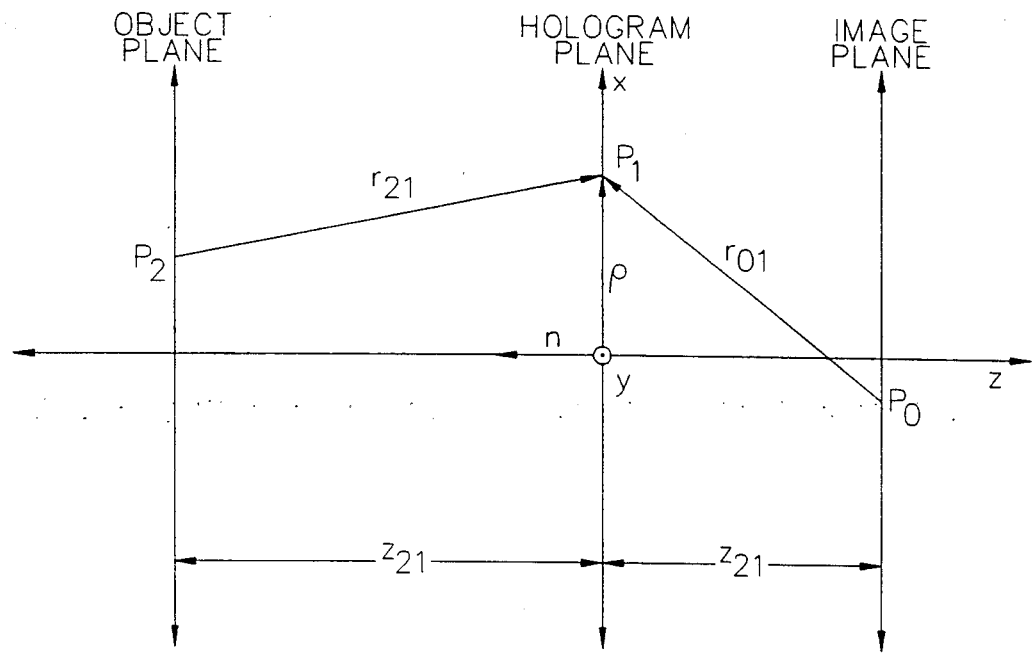
FIG. 2 schematically illustrates a method for modeling a single ring of a radially symmetric hologram in an on-axis system according to the Rayleigh-Sommerfeld diffraction formula.

The next step, block 40 in FIG. 1, is determining a plurality of radial phase transition points and radial phase values between the radial transition points for each concentric fringe from the identified set of optical system parameters in block 20 and the optical system constants in block 30. In order to determine the plurality of radial phase transition points and radial phase values, the Rayleigh-Sommerfeld diffraction formula is first used to model a single radially symmetric element or ring in an on-axis system as shown in FIG. 2. The scalar amplitude and phase distribution of the image plane is given by, $$U(P_0) = \frac{1}{j\lambda} \int\int U(P_1) \frac{\exp(j\kappa r_{01})}{r_{01}} \cos(\bar{n}, \overline{r_{01}}) ds \quad (5)$$

where $U(P_1)$ is the scalar amplitude and phase distribution in the hologram plane and the integrals are evaluated over the entire hologram plane (ds). Note that, in this formula, κ (kappa) is used to designate wave number $$\left( \kappa = \frac{2\pi}{\lambda} \right)$$

while k is reserved for a summation index, r is the radial distance vector in the image plane of the optical element, $\bar{n}$ is the unit normal, and j is the $\sqrt{-1}$. The scalar amplitude and phase distribution are found by multiplying the incident wave, $A(r_{21})$, by the hologram transmittance function, $H(P_1)$.

$$U(P_0) = H(P_1)A(r_{21}) \tag{6}$$

Using a hologram transmittance that is radially symmetric results in a separable equation.

$$U(P_0) = \frac{z_{01}}{j\lambda} \int_0^R \rho H(\rho) \int_0^{2\pi} A(\rho,\theta) \frac{\exp(jkr_{01})}{r_{021}} d\theta d\rho. \tag{7}$$

where $$\frac{z_{01}}{r_{01}} = \cos(\hat{n}, \overline{r_{01}}).$$

Figure 3:
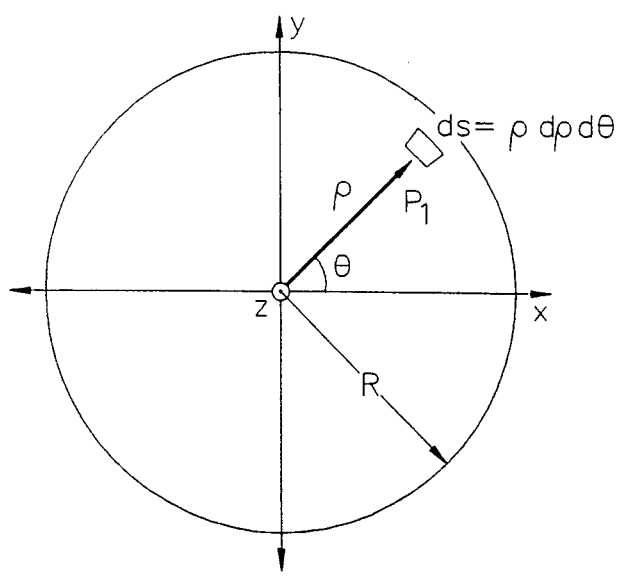
FIG. 3 schematically illustrates a hologram represented in radial coordinates.

$\rho$ and $\theta$ are coordinates in the hologram plane and R is the hologram radius as indicated in FIG. 3. This expression is then approximated as a summation $$U_{mn} = \frac{z_{01}}{j\lambda} \sum_{k=0}^{K} k\Delta\rho H_k \sum_{L=0}^{L=\frac{2\pi}{\Delta\theta}} A_{kL} \frac{\exp(jkr_{kLmn})}{r_{kLmn}^2} \Delta\theta\Delta\rho. \tag{8}$$

The hologram plane is represented in discrete radial coordinates ($\rho = \kappa\Delta\rho$) and ($\theta = L\Delta\theta$), points in the image plane are designated by m and n, and L is a summation index. Equation (8) may be rewritten as, $$U_{mn} = \sum_{k=0}^{K} H_k C_{kmn} \tag{9}$$

where $C_{kmn}$ is given by, $$C_{kmn} = \frac{z_{01}\Delta\theta(\Delta\rho)^2}{j\lambda} k \sum_{L=0}^{L=\frac{2\pi}{\Delta\theta}} A_{kL} \frac{\exp(jkr_{kLmn})}{r_{kLmn}^2}. \tag{10}$$

The calculation of the $C_{kmn}$'s in equation (10) represents a large part of the computation time needed to evaluate the image amplitude and phase distribution. Notice, however, that the $C_{kmn}$'s are completely independent of the hologram transmittance function. Therefore, these sums may be preprocessed and stored as a three dimensional array. This stored array, in turn, allows for quick computation of the image amplitude and phase distribution each time a change in the hologram transmittance is made.

Figure 4:
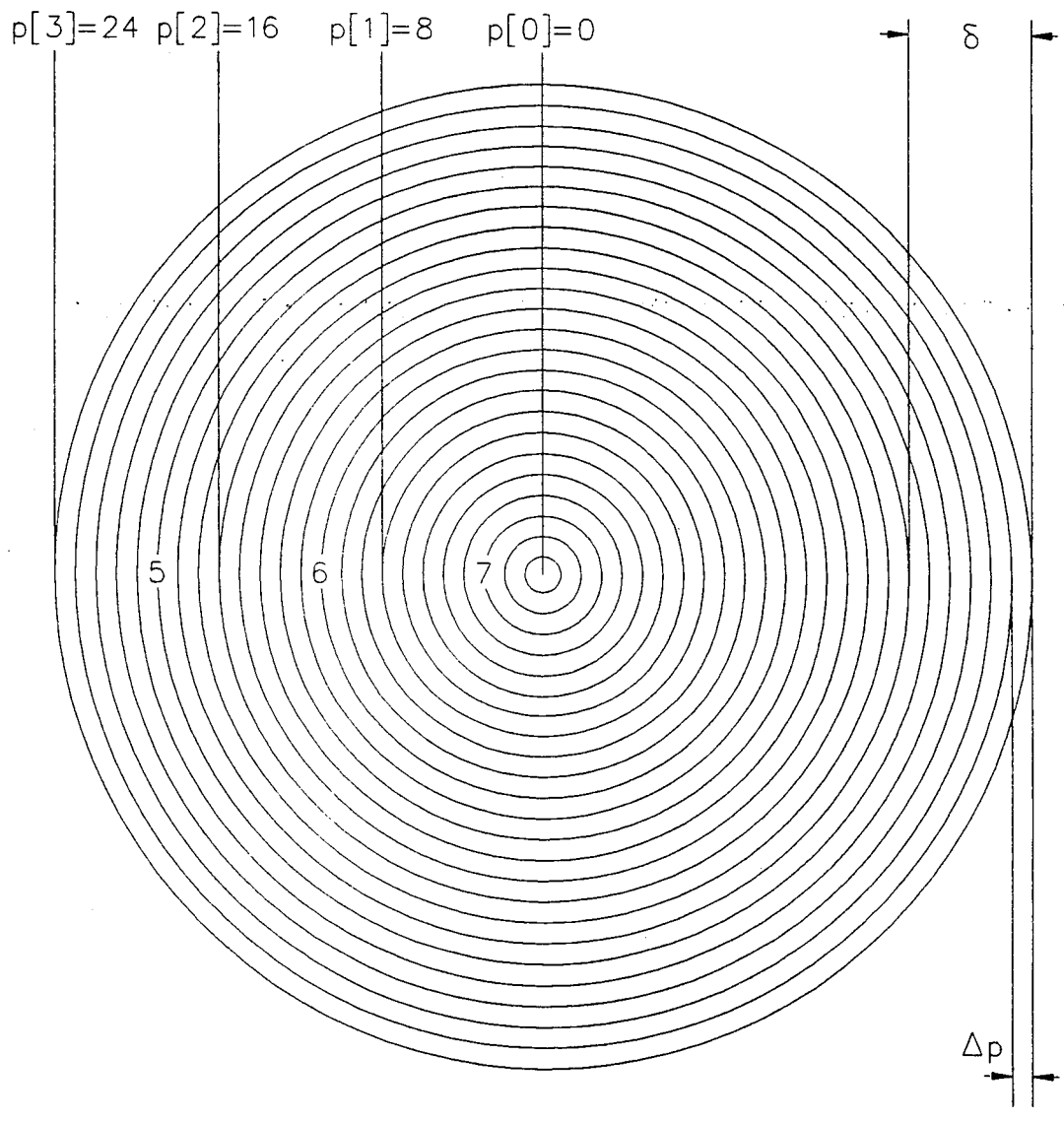
FIG. 4 schematically illustrates the transmittance of a radially symmetric hologram according to the present invention.

Based upon the Rayleigh-Sommerfeld diffraction formula for modelling a single ring, the entire hologram now may be represented as a set of K concentric rings as shown in FIG. 4. The amplitude of the hologram transmittance is unity over the entire hologram (a continuous phase-only hologram). The phase of each ring, $\phi_k$, is restricted to a constant value and is further restricted to one of N values in the following set, $$\phi_k \epsilon \left\{ 0, \frac{2\pi}{N}, 2\frac{2\pi}{N}, 3\frac{2\pi}{N}, \ldots, \left(N-1\frac{2\pi}{N}\right) \right\} \tag{11}$$

Since the amplitude of the hologram is unity over the entire hologram, the hologram transmittance may now be given by, $$H_k = \exp[j\phi_k]. \tag{12}$$

For most hologram fabrication procedures the minimum feature size ($\delta$) is significantly larger than the feature placement accuracy ($\Delta\rho$). In order to account for this property, the K rings are grouped into P concentric fringes of constant phase where P<<K. Each of the P fringes will contain at least $\delta/\Delta\rho$ of the K rings.

This grouping ensures that each fringe is at least as large as the hologram minimum feature size. $\Delta\rho$ is set to the minimum feature placement accuracy. Typical values are 0.3 $\mu$m to 1.0 $\mu$m for the minimum feature size and 0.03 $\mu$m to 0.5 $\mu$m for the placement accuracy.

Substituting the hologram transmittance of equation (12) into the scalar amplitude and phase distribution of the image as described by equation (5) yields $$U_{mn} = \sum_{k=0}^{K} \exp(j\phi_k) C_{kmn}. \tag{13}$$

Writing this as P fringes of constant phase yields $$U_{mn} = \sum_{p=1}^{P} \exp(j\phi_p) \sum_{k=k_s(p)}^{k_s(p+1)-1} C_{kmn} = \sum_{p=1}^{P} \exp(j\phi_p) S_{pmn} \tag{14}$$

where $S_{pmn}$ represents the contribution of the pth fringe to the amplitude $U_{mn}$. $S_{pmn}$ is given by $$S_{pmn} = \sum_{k=k_s(p)}^{k_s(p+1)-1} C_{kmn}. \tag{15}$$

Figure 5:
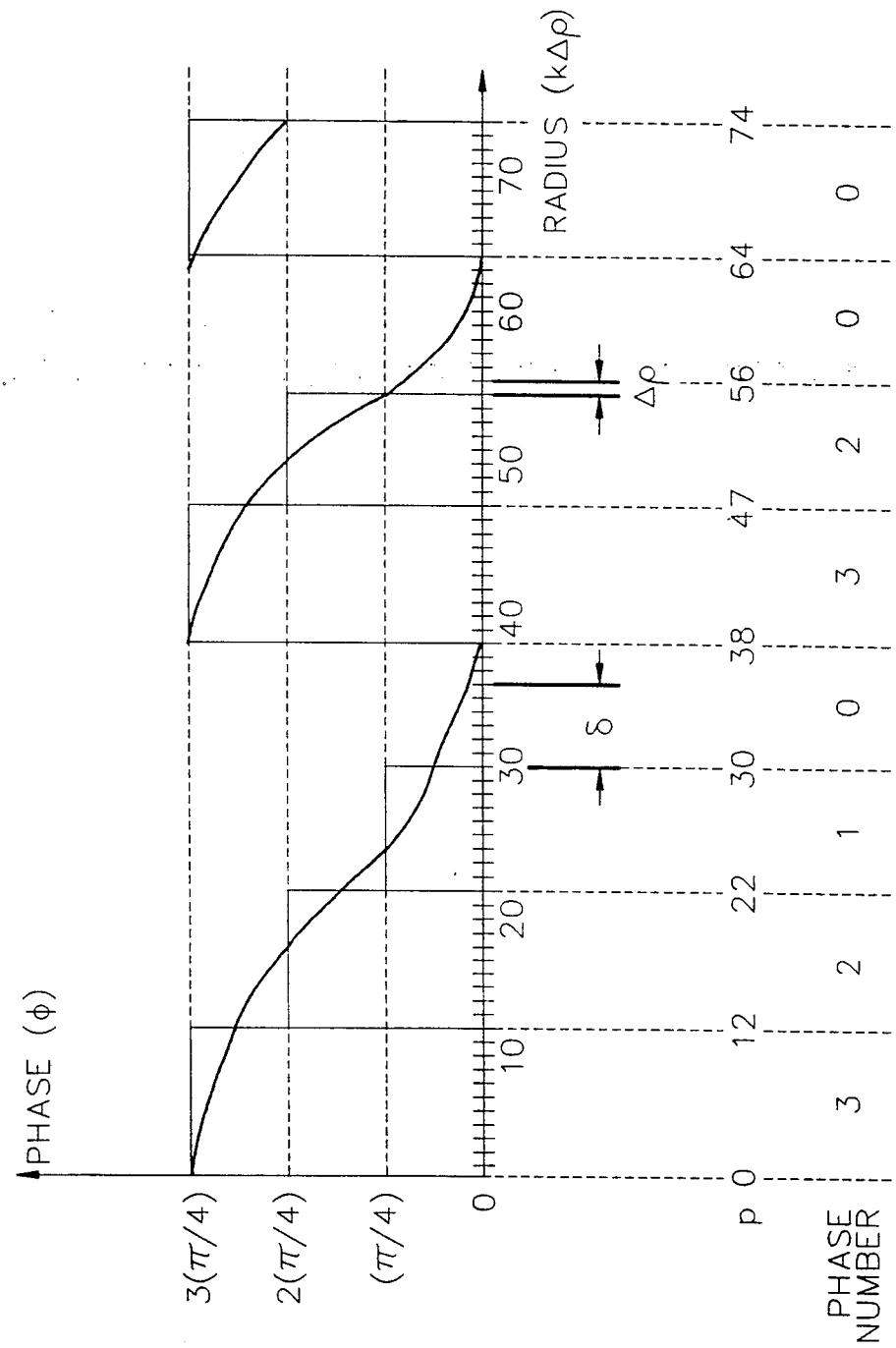
FIG. 5 schematically illustrates a profile for a computer generated hologram with 74 rings and 8 fringes, according to the present invention.

FIG. 5 shows a CGH for K=74 and P=8. The phase transmittance of this hologram is plotted as a function of the radial distance from the origin. Note that the minimum feature size ($\delta$) is equal to $7\Delta\rho$, so that each fringe contains at least 7 rings.

The hologram is completely specified by two arrays. One array contains the indices $k_s(p)$, indicating the radii at which the phase makes a transition from one predetermined phase level to the next. The other array contains the phase value ($\phi_p$) of each concentric fringe.

Referring again to FIG. 1, once an initial plurality of radial phase transition points and radial phase values have been determined which, in turn, specify the hologram transmittance function, an error function is determined as shown in block 50. The error function is based upon the image quality which is determined from the intensity distribution in the output plane.

The error function may be determined from error measurement techniques such as Modulation Transfer Function ("MTF"), diffraction efficiency ($\eta$), Mean Squared Error ("MSE"), Signal to Noise Ratio ("SNR") or other image criteria. For many CGH applications, including optical interconnects and fiber optic couplings, it is often sufficient to base the performance on the diffraction efficiency. In this case, a useful error function may be given by $$e = 1 - \eta \tag{16}$$

where $\eta$ is the diffraction efficiency and e is t error.

The intensity of each element in the image plane is given by the modulus squared of each $U_{mn}$. The power in each element, $P_{mn}$, is the intensity multiplied by a single element area. Similarly the total power incident to the hologram is given by a constant, $$P_{inc} = \Delta\rho\Delta\theta \sum_{k=0}^{K = \frac{2\pi}{\Delta\theta}} \sum_{L=0}^{L = \frac{2\pi}{\Delta\theta}} |A_{kL}|^2 \qquad (17)$$

Finally, the diffraction efficiency is determined by summing the power in the reconstruction region of the image plane and dividing by the incident power on the hologram expressed as $$\eta = \frac{\sum_{m=1}^{M} \sum_{b=1}^{B} P_{mb}}{P_{inc}} \qquad (19)$$

where $P_{inc}$ is the power incident on the hologram and $P_{mn}$ is the power deflected to the image plane coordinate with indices (m,b).

The M and B points in equation (18) are chosen to direct light to desired locations in the image plane. For example, for optical interconnect applications a detector would be placed in a specific location in the image plane, and the M and B points would be evenly distributed over the surface area of the detector.

By changing the error function, the element may be optimized to provide performance for a range of input wavefronts. For example, an error function given by $$e = \sum_{q=1}^{Q} a_q(1 - \eta_q) \qquad (19)$$

will yield a CGH with high performance for Q input wavefronts. In equation (19), $\eta_q$ is the diffraction efficiency for the $q^{th}$ input wavefront and $a_q$ is a user specified constant termed a "weight". The values of the weights are adjusted to vary the relative importance associated with each input wavefront.

Referring again to FIG. 1, at block 60 the initial plurality of radial phase transition points and radial phase values is repeatedly optimized to find the radial phase transition locations and the radial phase values that minimize the error function as stated in equation (19). After the initial radial phase transition points and radial phase values are chosen, changes are made to the inner most fringe's phase value and location. The error function is recalculated and the change is either accepted or rejected. Each fringe is changed in consecutive order until the outer most fringe is reached. This constitutes a single iteration.

The error function is recalculated rapidly by computing only the change in the diffraction pattern due to a change in the transmittance and location of a single fringe. This recalculation process continues until high system performance occurs when certain optimized phase transition points and optimized phase values are reached. These optimized phase transition points and optimized phase values are then retained by the encoding array.

Figure 6:
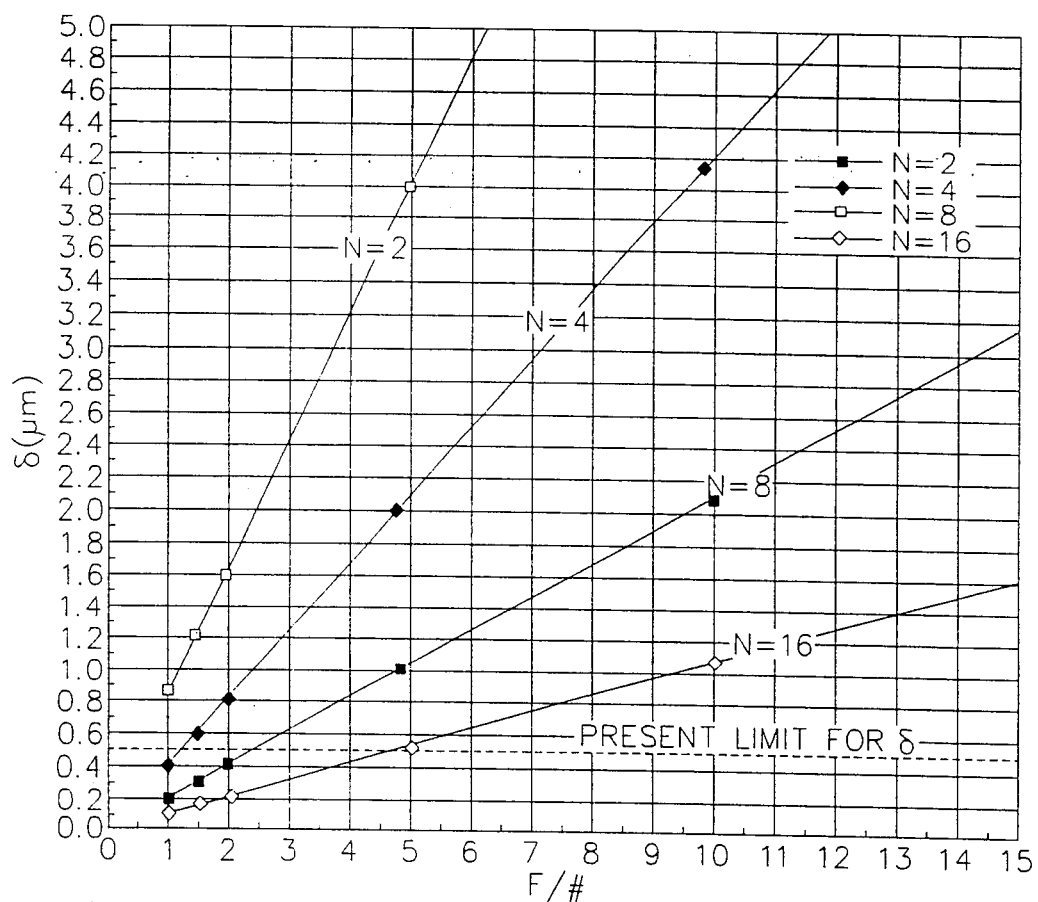
FIG. 6 schematically illustrates how a known radially symmetric hologram fabrication method (Direct Sampling) is limited by the minimum feature size (δ).

FIG. 6 illustrates how the Direct Sampling method of the known prior art is limited by the minimum feature size ($\delta$). Presently, features of about 0.5 $\mu$m are the smallest features that may be reliably fabricated with most modern deep ultra-violet wafer steppers. Therefore, only two (2) phase levels may be used to fabricate an element with a f-number = 1 which results in a maximum efficiency of 41% if N is restricted to $2^J$ phase levels as described in equation (4) where J is the number of masks. Feature sizes of approximately 0.2 $\mu$m are required to achieve diffraction efficiencies of approximately 94% using the Direct Sampling method. The RSIDO encoding method, on the other hand, has phase levels N only restricted as shown below:

$$J+1 \leq N \leq 2^J \qquad (20)$$

In other words, the RSIDO encoding method is not restricted to $2^J$ phase levels, where J masks are used.

Figure 7:
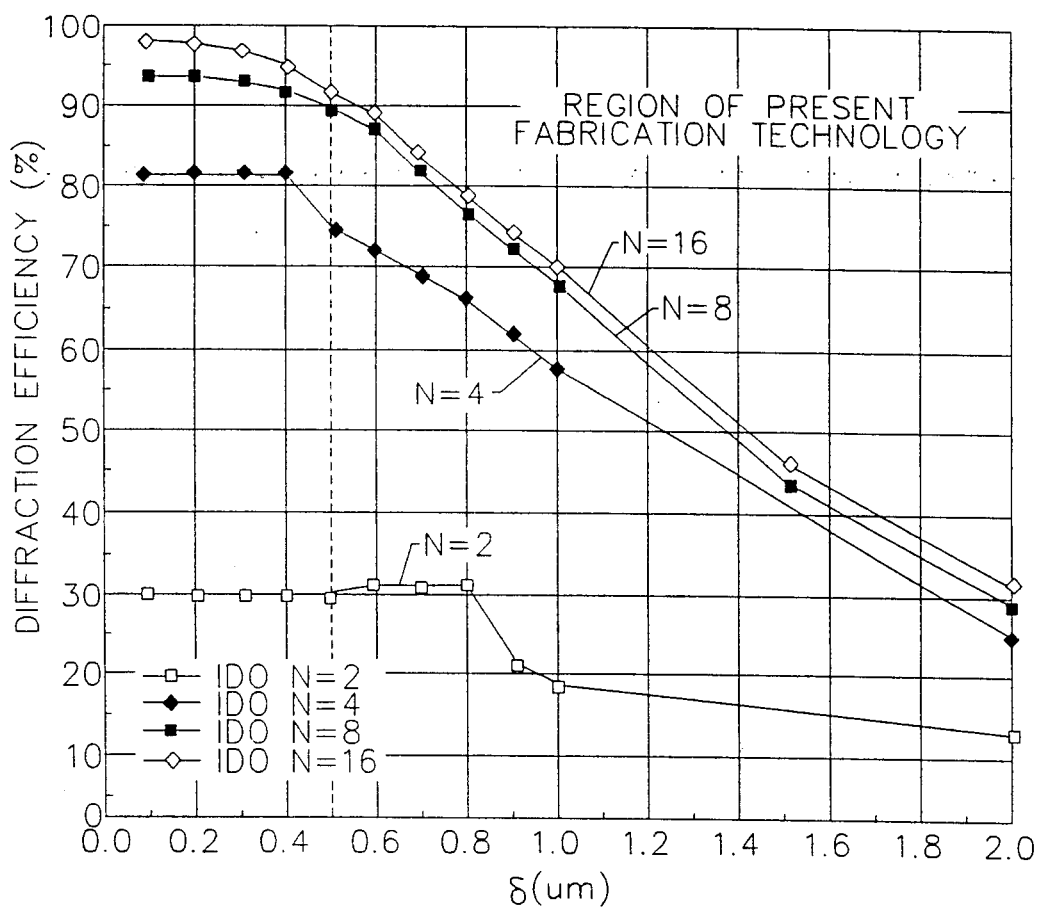
FIG. 7 schematically illustrates diffraction efficiency versus minimum feature size for an element with f-number =1 according to the present invention.
Figure 8:
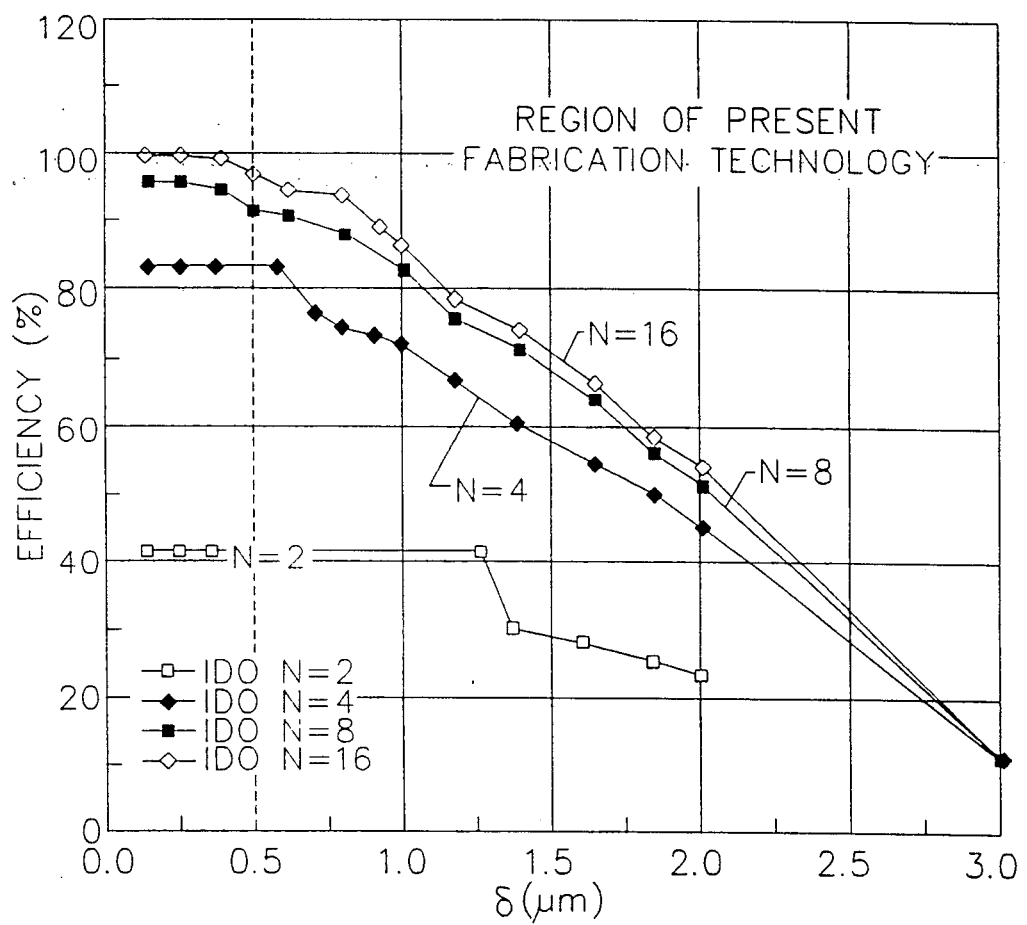
FIG. 8 schematically illustrates diffraction efficiency versus minimum feature size for an element with f-number =1.5 according to the present invention.
Figure 9:
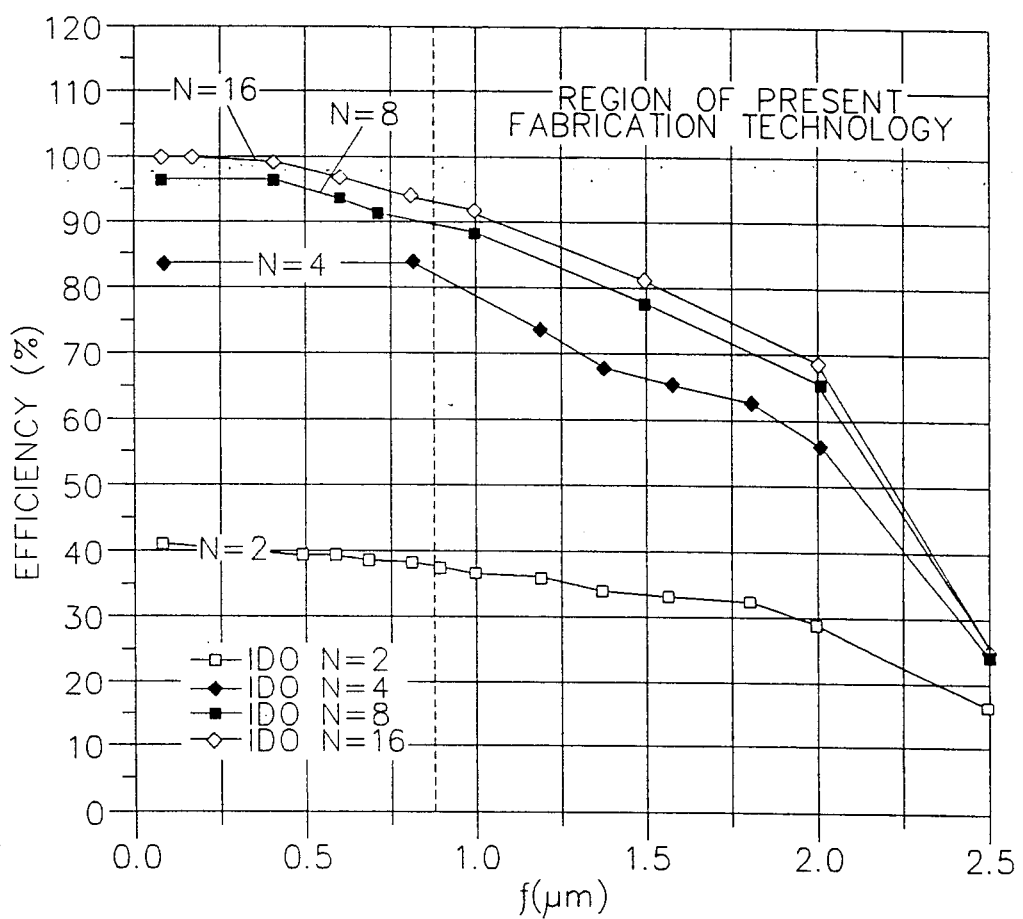
FIG. 9 schematically illustrates diffraction efficiency versus minimum feature size for an element with f-number =2 according to the present invention.

FIG. 7 illustrates the diffraction efficiency versus minimum feature size ($\delta$) for an element with a f-number = 1 using the RSIDO encoding method of the present invention. Note that for $\delta = 0.7$ $\mu$m diffraction efficiencies of greater than 80% may be reached. FIGS. 8 and 9 show similar graphs for elements with a f-number = 1.5 and a f-number = 2 respectively. The RSIDO encoding method yields elements with a f-number = 2 that approach the analytic result given by equation (3) using presently known fabrication feature sizes of 0.7 $\mu$m.

Figure 10A:
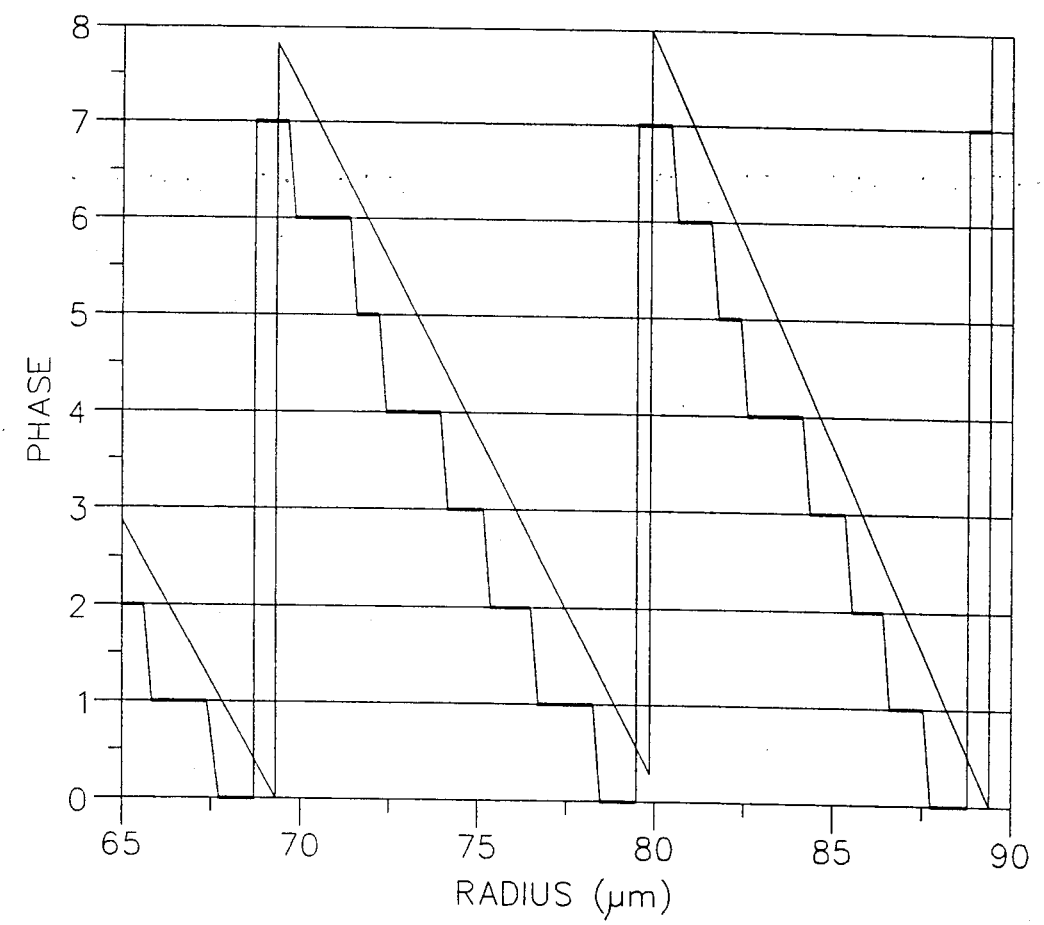
FIG. 10A-10C schematically illustrate f-number =1 encoded phase profiles at different radii according to the present invention.
Figure 10B:
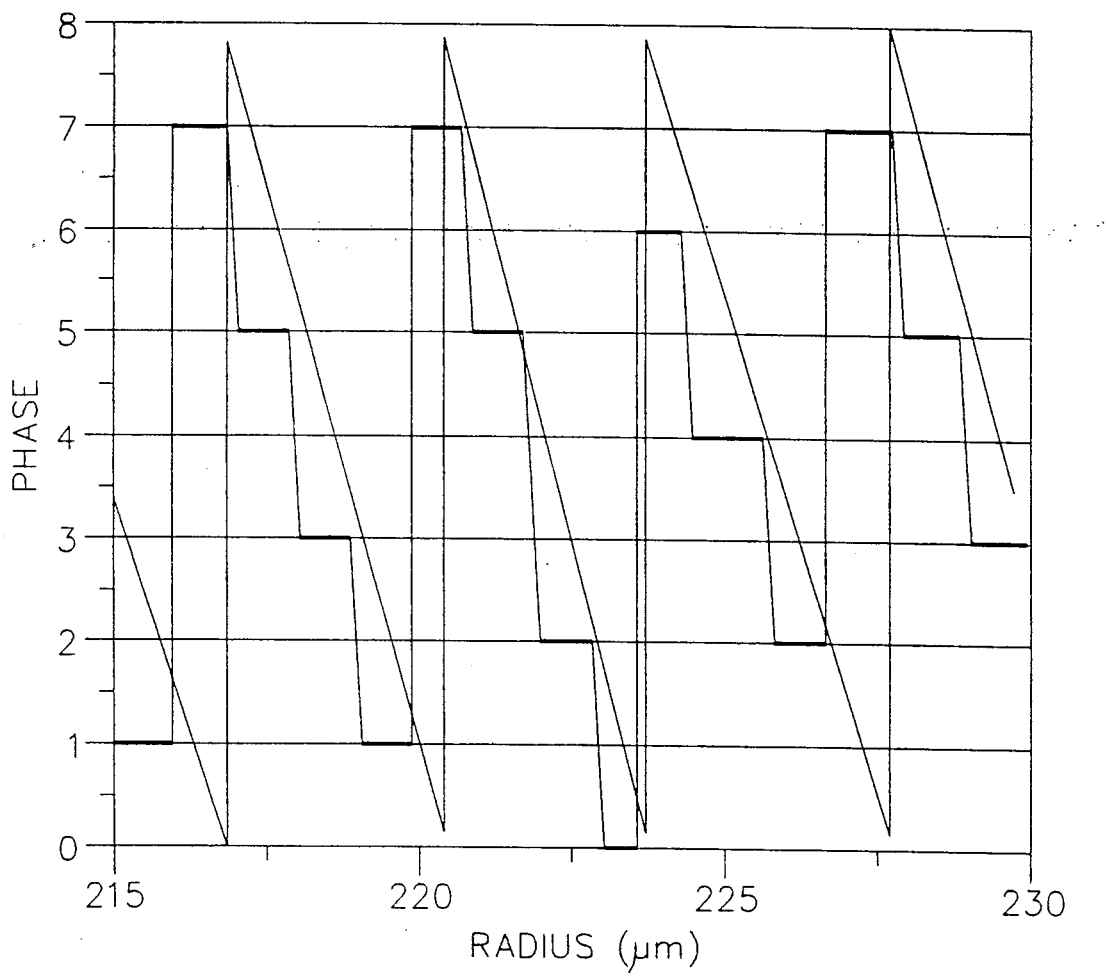
Figure 10C:
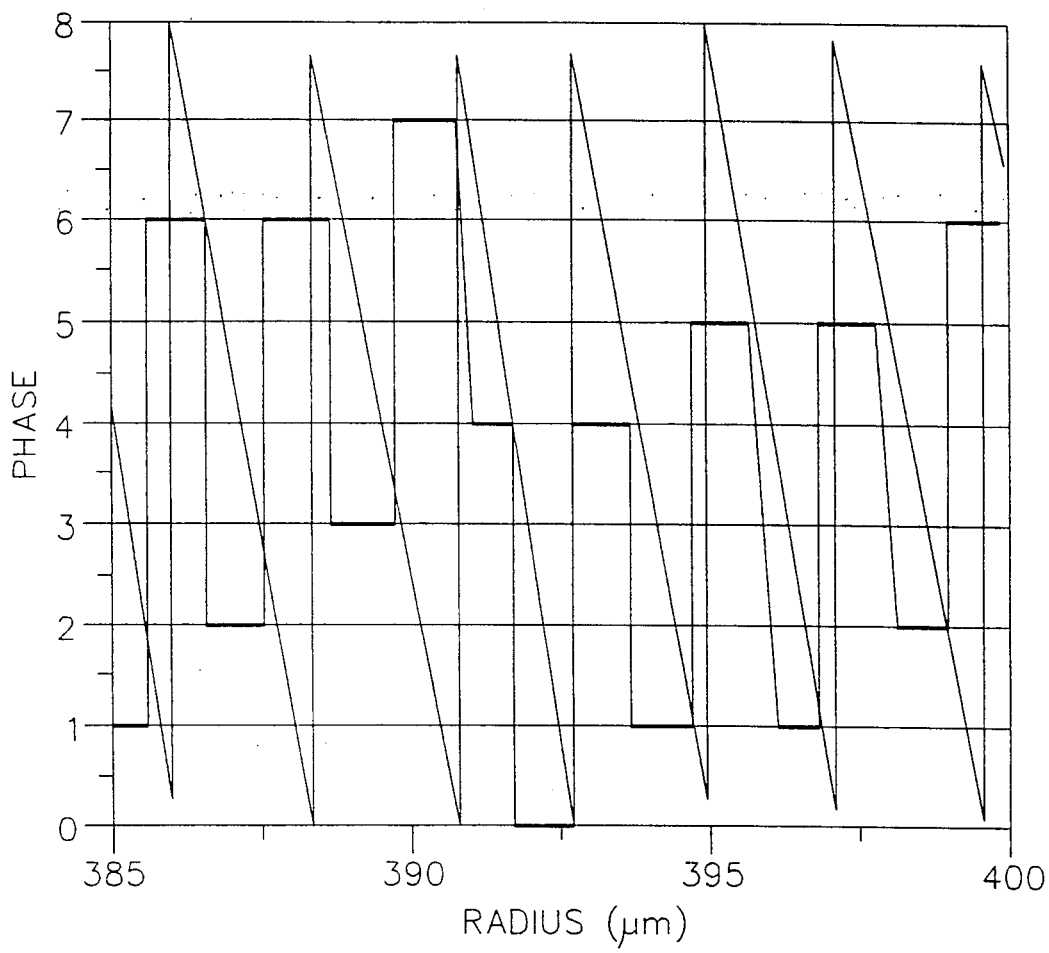

FIGS. 10A, 10B, and 10C compare the RSIDO encoding method with the Direct Sampling method and illustrate the differences in the resulting holograms. FIGS. 10A, 10B, and 10C illustrate a RSIDO encoded phase profile with a f-number = 1 for different radii. Eight phase levels are used and the resulting diffraction efficiency is 67%. FIG. 10A is a small compared to the minimum feature size ($\delta = 1.0$ $\mu$m). In this case, RSIDO encoding is similar to Direct Sampling. The phase levels are consecutive from 7 to 0. Notice, however, that the rectangles are not necessarily subscribed. The RSIDO encoding method may sometimes move the fringes slightly to improve the diffraction efficiency. The continuous function, in this case, had a diffraction efficiency of 100% so that the fringe adjustment is made to compensate for the effects of the encoding on the diffraction efficiency.

FIG. 10B is the same hologram as in FIG. 10A, but with a larger radius. Here, the hologram grating period is small as compared to the minimum feature size ($\delta$) so that all eight (8) phase levels no longer fit in one period. This represents the point where Direct Sampling may no longer be used. The RSIDO encoding method will randomly select phase levels until the highest diffraction efficiency is obtained. Notice how this method selects different phase levels for very similar fringes.

Also illustrated in FIG. 10B, the RSIDO encoded holograms differ from conventional radially symmetric holograms because in RSIDO encoded holograms, the difference in the number of phase levels (N) between at least two adjacent fringes is greater than one and less than the predetermined number of concentric fringes minus one; i.e., "phase skipping" is present. Phase skipping is used to optimize the hologram's performance.

FIG. 10C is the same hologram as in FIGS. 10A and 10B, but with even a larger radius. FIG. 10C shows the hologram fringes near the edge where the grating period is approximately two times the minimum feature size ($\delta$). While the designer might expect phase levels (N) separated by $\pi$ radians to be selected, RSIDO encoding determines that more unlikely choices yield the highest diffraction efficiencies.

FIG. 11 is a set of tables which compare the best possible results for radially symmetric holograms using the Direct Sampling method versus the RSIDO encoding method. For elements with a f-number = 5, the two methods yield about the same results if small minimum feature sizes are used. For elements with a f-number <5, however, the RSIDO encoding method yields much higher diffraction efficiencies as illustrated in FIGS. 11A and 11B. The table in FIG. 11C numerically illustrates how, for a $\delta = 2.0$ μm, which is the limit for some facilities such as a proximity lithography mask aligner, RSIDO may be used to provide much higher diffraction efficiencies for elements with a f-number as high as 5.

The previous RSIDO encoding method described above is the result of starting with continuous phase functions that have diffraction efficiencies of 100% before encoding. In addition, RSIDO is useful for encoding and improving the diffraction efficiency of poor starting continuous functions for one or two optical element systems. For example, a continuous phase function with a diffraction efficiency of only 4.35% was used as a starting function. RSIDO encoding with an appropriate annealing schedule resulted in an 8-phase level hologram of 0.7 μm features with a diffraction deficiency of 81%.

In this manner, IDO encoding may be simplified. Instead of determining the continuous phase profile using a ray tracing program, such as CODE V, and subsequently encoding, the encoding and hologram phase function may be determined in one step. This procedure typically yields holograms with much higher performance than the two-step procedure.

In many element systems, however, the previous RSIDO encoding method of starting with a continuous phase function having a 100% diffraction efficiency would be preferred. In this case, the error function is often determined by the correlation between the discrete phase and the continuous phase functions.

Referring again to FIG. 1, fabrication of the hologram, block 70, occurs after the optimized phase transition points and optimized phase values are determined and retained by the RSIDO encoding process. In this step, a plurality of masks are produced having concentric fringes corresponding to the retained optimized phase transition points and optimized phase values. The masks then are utilized for an etching process, well known to those skilled in the art, on a radially symmetric hologram substrate. Other hologram fabrication techniques, such as deposition techniques, may also be used.

It is also well known to those skilled in the art to use only portions of a radially symmetric hologram during the design process wherein the resulting hologram is not necessarily radially symmetric. The RSIDO encoding method may be used for these applications as well.

Figure 12:
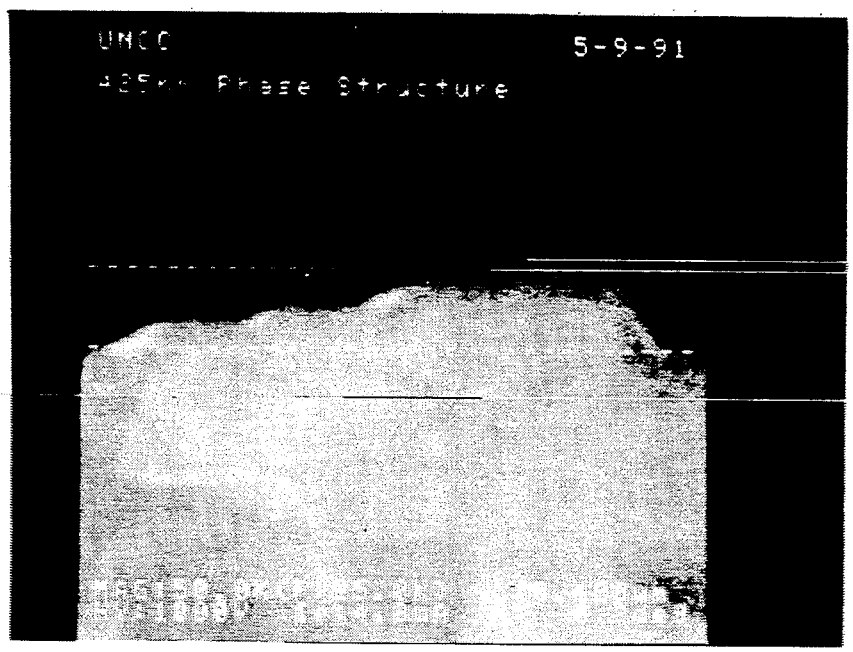
FIG. 12 is a scanning electron micrograph cross sectional view of a radially symmetric hologram fabricated by using deposition and liftoff according to the present invention.

FIG. 12 is a scanning electron micrograph cross sectional view of a radially symmetric hologram fabricated according to the present invention, using the well known microelectronics fabrication techniques of deposition and liftoff. The micrograph illustrates the present invention with eight (8) phase levels which no longer fit into one grating period (T) because the period is small as compared to the minimum feature size (δ). Since the holograms fabricated with eight (8) phase levels and only five (5) phase levels are shown between fringes of constant phase, the "phase skipping" property of the RSIDO encoding method is shown.

In the drawings and specification, there have been disclosed typical preferred embodiments of the invention and, although specific terms are employed, they are used in a generic and descriptive sense only and not for the purposes of limitation, the scope of the invention being set forth in the following claims.

That which is claimed is:

1. A method of fabricating a radially symmetric hologram, having a plurality of concentric fringes of constant radial phase, comprising the steps of:
   determining a plurality of radial phase transition points and radial phase values between said radial phase transition points for each concentric fringe;
   repeatedly optimizing said plurality of radial phase transition points and said radial phase values to obtain optimized radial phase transition points and optimized radial phase values; and
   fabricating a radially symmetric hologram having concentric fringes of constant radial phase corresponding to said optimized radial phase transition points and said optimized radial phase values
   wherein said repeatedly optimizing step comprises repeatedly performing the following steps:
   determining an optical system error function for said hologram;
   changing said plurality of radial phase transition points and radial phase values;
   determining whether said changed plurality of radial phase transition points and radial phase values reduces said optical system error function; and
   retaining said changed radial phase transition points and radial phase values if said error function is reduced.

2. The method of claim 1 wherein said determining step is preceded by the step of:
   identifying a set of optical parameters for said hologram; and
   wherein said determining step comprises the step of determining said plurality of radial phase transition points an radial phase values for each fringe of constant radial phase from said identified set of optical system parameters.

3. The method of claim 2 wherein the following step is performed between said identifying step and said determining step:
   determining a plurality of optical system constants from the identified set of optical system parameters for said hologram.

4. The method of claim 1 wherein said determining an optical system error function step comprises the step of:
   determining said error function from a correlation between a discrete phase function and a continuous phase function.

5. The method of claim 1 wherein the step of fabricating said hologram comprises the steps of:
   producing a predetermined plurality of masks having concentric fringes corresponding to said optimized radial phase transition points and said optimized radial phase values; and
   utilizing said masks to fabricate a radially symmetric hologram on a substrate.

6. The method of claim 5 wherein said utilizing step comprises the step of utilizing said predetermined plurality of masks to fabricate a hologram having phase levels greater than said predetermined plurality, and less than or equal to two raised to the power of said predetermined plurality.

7. The method of claim 1 further comprising the steps of:
 producing a master radially symmetric hologram; and
 using said master radially symmetric hologram to emboss a plurality of radially symmetric holograms on a corresponding plurality of substrates.

8. A method of fabricating a hologram comprising the steps of:
 producing a predetermined plurality of masks; and
 utilizing said predetermined plurality of masks to fabricate a hologram having phase levels greater than said predetermined plurality of masks, and less than two raised to the power of said predetermined plurality.

9. A method of fabricating a radially symmetric hologram, having a plurality of concentric fringes of constant phase, comprising the steps of:
 specifying an optical system;
 identifying a set of optical system parameters for said optical system;
 determining optical system constants from said set of optical system parameters;
 determining a plurality of radial phase transition points and radial phase values between said radial phase transition points for each concentric fringe, from said set of optical system parameters and optical system constants;
 determining an optical system error function for said plurality of radial phase transition points and radial phase values between said radial phase transition points for each concentric fringe;
 repeatedly optimizing said plurality of radial phase transition points and said radial phase values, to obtain optimized radial phase transition points and optimized radial phase values which reduce said optical system error function; and
 fabricating a radially symmetric hologram having concentric fringes of constant radial phase corresponding to said optimized radial phase transition points and said optimized radial phase values
 wherein said repeatedly optimizing step comprises repeatedly performing the following steps:
  changing said plurality of radial phase transition points and radial phase values;
  determining whether said changed plurality of radial phase transition points and radial phase values reduces said optical system error function; and
  retaining said changed radial phase transition points and optimized radial phase values if said error function is reduced.

10. The method of claim 9 wherein said determining an optical system error function step comprises the step of:
 determining said error function from a correlation between a discrete phase function and a continuous phase function.

11. The method of claim 9 wherein the step of fabricating said hologram comprises the steps of:
 producing a plurality of masks having concentric fringes corresponding to said optimized radial phase transition points and said optimized radial phase values; and
 utilizing said masks to fabricate a radially symmetric hologram on a substrate.

12. The method of claim 11 wherein said utilizing step comprises the step of utilizing said predetermined plurality of masks to fabricate a hologram having phase levels greater than said predetermined plurality, and less than or equal to two raised to the power of said predetermined plurality.

13. The method of claim 9 further comprising the steps of:
 producing a master radially symmetric hologram; and
 using said master radially symmetric hologram to emboss a plurality of radially symmetric holograms on a corresponding plurality of substrates.

14. A method of designing a radially symmetric hologram, having a plurality of concentric fringes of constant radial phase, comprising the steps of:
 determining a plurality of radial phase transition points and radial phase values between said radial phase transition points for each concentric fringe; and
 repeatedly optimizing said plurality of radial phase transition points and said radial phase values to obtain optimized radial phase transition points and optimized radial phase values
 wherein said repeatedly optimizing step comprises repeatedly performing the following steps:
  determining an optical system error function for said hologram;
  changing said plurality of radial phase transition points and radial phase values;
  determining whether said changed plurality of radial phase transition points and radial phase values reduces said optical system error function; and
  retaining said changed radial phase transition points and optimized radial phase values if said error function is reduced.

15. The method of claim 14 wherein said determining an optical system error function step comprises the step of:
 determining said error function from a correlation between a discrete phase function and a continuous phase function.

16. A method of designing a radially symmetric hologram comprising the steps of:
 specifying an optical system;
 identifying a set of optical system parameters for said optical system;
 determining optical system constants from said set of optical system parameters;
 determining a plurality of radial phase transition points and radial phase values between said radial phase transition points for each concentric fringe from said set of optical system parameters and optical system constants;
 determining an optical system error function for said first plurality of radial phase transition points and radial phase values between said radial phase transition points for each concentric fringe; and
 repeatedly optimizing said first plurality of radial phase transition points and said radial phase values to obtain optimized radial phase transition points and optimized radial phase values which reduce said optical system error function
 wherein said repeatedly optimizing step comprises performing the following steps:
  changing said plurality of radial phase transition points and radial phase values;
  determining whether said changed plurality of radial phase transition points and radial phase values reduces said optical system error function; and retaining said changed radial phase transition points and optimized radial phase values if said error function is reduced.

17. The method of claim 16 wherein said determining an optical system error function comprises the step of:
determining said error function from a correlation between a discrete phase function and a continuous phase function.

18. A method of designing a hologram, having a plurality of fringes, comprising the steps of:
determining a plurality of phase transition points and phase values between said phase transition points for each fringe; and
repeatedly optimizing said plurality of phase transition points and said phase values to obtain optimized phase transition points and optimized phase values
wherein said repeatedly optimizing step comprises performing the following steps:
determining an optical system error function for said hologram;
changing said plurality of phase transition points and phase values;
determining whether said changed plurality of phase transition points and phase values reduces said optical system error function; and
retaining said changed phase transition points and optimized phase values if said error function is reduced.

19. The method of claim 18 wherein said determining an optical system error function step comprises the step of:
determining said error function from a correlation between a discrete phase function and a continuous phase function.

20. A radially symmetric hologram comprising:
a substrate, having a plurality of concentric constant radial phase fringes thereon, each fringe having a predetermined plurality of radial phase rings;
said constant radial phase fringes having a predetermined number of phase levels, at least two adjacent fringes having a phase level difference which is greater than one phase level and less than said predetermined number of phase levels minus one phase level.

21. The hologram of claim 20 wherein each fringe corresponds to a predetermined plurality of radial phase transition points and a radial phase value between said plurality of radial phase transition points.

* * * * *

UNITED STATES PATENT AND TRADEMARK OFFICE
CERTIFICATE OF CORRECTION

PATENT NO. :         5,202,775                        Page 1 of 3

DATED     :         April 13, 1993

INVENTOR(S) :     Feldman et al.

It is certified that error appears in the above-identified patent and that said Letters Patent is hereby corrected as shown below:

On title page, item [54]

In the TITLE:

"Radically" should be --Radially--.

Title page, item [56] add the following "U.S. PATENT DOCUMENTS"

| | | |
|---|---|---|
| 3,832,027 | 8/74 | King |
| 3,856,986 | 12/74 | Macovski |
| 4,607,914 | 8/86 | Fienup |
| 4,649,351 | 3/87 | Veldkamp et al. |
| 4,813,762 | 3/89 | Leger et al. |
| 4,895,790 | 1/90 | Swanson et al. |
| 4,960,311 | 10/90 | Moss et al. |
| 4,969,700 | 11/90 | Haines |

Item [56] "FOREIGN DOCUMENT"

5950480         3/84         China

Add the following OTHER PUBLICATIONS:

"Interactive Encoding of High-Efficiency Holograms For Generation of Spot Arrays", by Michael R. Feldman & Clark C. Guest, pgs. 479-481.

"Computer-Generated Rainbow Holograms", by Detlef Leseberg and Olof Bryngdahl, pgs. 2441-2447.

"Computer-Generated Holograms For Geometric Transformations", by Jack Cederquist and Anthony M. Tai, pgs. 3099-3104.

UNITED STATES PATENT AND TRADEMARK OFFICE
CERTIFICATE OF CORRECTION

PATENT NO. :      5,202,775
DATED      :      April 13, 1993
INVENTOR(S) :     Feldman et al.

It is certified that error appears in the above-identified patent and that said Letters Patent is hereby corrected as shown below:

Column 1, in the Title: "Radically" should be --Radially--.

Column 2, line 2, "*Iterative encoding is*" should be --Iterative encoding is--.

Column 2, line 3, "*also described in publication entitled*" should be --also described in publication entitled--.

Column 6, Equation (5): "$\Lambda$" should be --$\lambda$--.

Column 6, line 64, "$\Lambda$" should be --$\lambda$--.

Column 7, Equation (7): "$\Lambda$" should be --$\lambda$--.

Column 7, Equation (8): "$\Lambda$" should be --$\lambda$--.

Column 7, Equation (10): "$\Lambda$" should be --$\lambda$--.

Column 8, last line, "t" should be --the--.

Column 9, line 16, "(19)" should be --(18)--.

Column 9, Equation (19): "O" should be --Q--.

UNITED STATES PATENT AND TRADEMARK OFFICE
CERTIFICATE OF CORRECTION

PATENT NO. : 5,202,775
DATED : April 13, 1993
INVENTOR(S) : Feldman et al.

It is certified that error appears in the above-identified patent and that said Letters Patent is hereby corrected as shown below:

Column 10, line 32, after "small", please insert --radius where the hologram grating period is quite large--.

Column 12, line 41, "an" should be --and--.

Signed and Sealed this

Eighth Day of February, 1994

Attest:

BRUCE LEHMAN

Attesting Officer

Commissioner of Patents and Trademarks